United States Patent [19]

Paddington

[11] Patent Number: 4,622,997

[45] Date of Patent: Nov. 18, 1986

[54] EMERGENCY RELEASE COUPLERS

[75] Inventor: Arthur L. Paddington, Whitstable, England

[73] Assignee: Bridon P.L.C., England

[21] Appl. No.: 759,171

[22] Filed: Jul. 26, 1985

[30] Foreign Application Priority Data

Jul. 27, 1984 [GB] United Kingdom ............... 8419197

[51] Int. Cl.4 ............................................. F16L 23/04
[52] U.S. Cl. ............................... 137/595; 137/614.06; 285/409
[58] Field of Search ............. 137/595, 614.06, 614.11; 251/149.9, 250.5; 285/409, DIG. 21

[56] References Cited

U.S. PATENT DOCUMENTS

| 3,372,715 | 3/1968 | Ashton | 137/615 X |
| 4,079,752 | 3/1978 | Paddington | 137/614.06 X |
| 4,231,398 | 11/1980 | Gibbons | 137/614.06 X |
| 4,354,522 | 10/1982 | Bormioli | 137/614.02 |
| 4,515,182 | 5/1985 | LeDevehat | 137/614.06 |

FOREIGN PATENT DOCUMENTS 2717135 10/1978 Fed. Rep. of Germany ........................ 137/614.06

Primary Examiner—Gerald A. Michalsky
Attorney, Agent, or Firm—Wegner & Bretschneider

[57] ABSTRACT

An emergency release coupler for releasably coupling together two pipes comprises first and second valves each adapted to be connected to a respective pipe and a band coupler for coupling together said valves. Each valve comprises a casing housing a valve member movable between closed and open positions. The band coupler comprises segments which are pivotally interconnected and on which are mounted clamping members adapted to be held together by a clamping device. The segments and clamping members serve to clamp the valve casings together. Gear quadrants, mounted on the valve casings, are arranged to be driven via a linkage by the piston rod of a hydraulic ram which, when driven in one direction, is effective to cause the gear quadrants to move the associated valve members to the open position and, when moved in the opposite direction, is effective to cause the gear quadrants to move the associated valve members to the closed position. The clamping device is acted on by the linkage so that, after the valve members have been moved to the closed position, continued movement of the piston rod in said opposite direction causes the linkage to operate the clamping device to release the clamping members so that the clamping members ane segments are no longer effective to clamp the valve casings together whereby the casings can be separated from each other. Since the valves are closed before the casings are separated, spillage of a product in the pipes is avoided.

11 Claims, 8 Drawing Figures

EMERGENCY RELEASE COUPLERS

BACKGROUND OF THE INVENTION

This invention relates to emergency release couplers for coupling together two pipes. The invention is particularly applicable to the coupling of a tanker loading or discharge pipe to an offshore installation or a shore-mounted pipe, for example a pipe mounted on a jetty. However, the coupler could be used in other contexts where two pipes are to be releasably coupled together.

Emergency release couplers usually form part of marine loading arm cargo transfer systems which are installed on jetties at marine terminals and which are used to connect a shore line to a tanker. Marine loading arms are used worldwide for loading and discharging all sizes of tankers with practically every type of hydro carbonate.

The loading arm usually consists of an articulated pipe structure connected to the tanker manifold by either a bolted flange or, more commonly, a tanker manifold coupler. The loading arms are moved into position and, where a coupler is fitted, coupled by hydraulic power. In recent years, when volatile products are being handled, it has been the practice to fit emergency release couplers behind the manifold coupler of the tanker.

Emergency release couplers consist of two valves, one each side of a band clamp coupler, and are used for rapid separation of a tanker from a loading arm with minimum spillage. The normal sequence of operation is to close the main product line valves, close the emergency release coupler valves and then to operate the band clamp coupler to the release loading arm. The tanker carries away the lower valve of the emergency release coupler system and pipe work to the coupler which are retrieved later and re-assembled to the loading arm.

On some liquid petroleum gas tankers and liquid natural gas tankers, a separate gas return line is incorporated in the system. This line also has an emergency release coupler so that both lines may be severed in an emergency.

A typical emergency, when the emergency release couplers are operated, is when a tanker breaks its moorings and drifts off the jetty due to external forces, requiring the rapid severence of the loading arm with minimum spillage.

An emergency release coupler is known which comprises two ball valves and a band clamp. The top valve is operated by a hydraulic cylinder and the other valve is operated by a push rod system. The coupler is operated by a separate hydraulic cylinder and relies on sequence valves to control the operation. This system has proved not to be one hundred per cent reliable owing to faults in the hydraulic system.

In another known system having a gas return line, the gas return line has a separate emergency release coupler and from the lower valve there is a flexible pipe connection to the tanker manifold. In an emergency, the disconnected gas return line and valve, the lower portion of the emergency release coupler unit, falls two to three metres onto the deck of the tanker. The product line coupler units and the gas return line coupler units have separate hydraulic circuits and have to be controlled by sequence valves. This system has also proved to be less than satisfactory.

SUMMARY OF THE INVENTION

The object of the present invention is to provide an emergency release coupler which gives a more positive action and which has safe and reliable operation.

According to the invention, there is provided an emergency release coupler for releasably coupling together two pipes which comprises a first valve adapted to be coupled to a first pipe, a second valve adapted to be coupled to a second pipe and a band coupler for coupling together said valves; wherein each valve comprises a casing housing a pivotally mounted valve member which is movable between a closed and an open position, each valve member being mounted on a respective shaft which extends out of the associated casing; wherein the band coupler comprises a plurality of segments, each segment being pivotally connected at one end to an adjacent segment and connected at its other end to a further segment or to a clamping member, two said clamping members being provided which are adapted to be held together by a clamping device and the segments and clamping members serving to clamp the valve casings together; and wherein drive means are mounted on said shafts and are coupled to said clamping device, the drive means being arranged, when driven in one direction, to cause the shafts to pivot to move the associated valve members to the open position and, when driven in a direction opposite to said one direction, to cause the shafts to pivot to move the associated valve members to the closed position and then to operate the clamping device to release at least one of said clamping members so that the clamping members and segments are no longer effective to clamp the valve casings together whereby said casings can be separated from each other.

Preferably, the drive means are arranged to cause one shaft to move its associated valve member to the closed position before the other shaft is effective to move its associated valve member to the closed position.

The two shafts desirably extend substantially parallel to each other when the valve casings are clamped together.

The drive means desirably comprise mechanical drive means preferably in the form of gear drives. A further separate drive may be provided for acting on the clamping device to hold the clamping members together.

According to a preferred embodiment of the invention, the gear drives comprise a pair of gear quadrants, each mounted on a respective shaft and arranged to mesh with one another when the valve casings are clamped together. One of the gear quadrants may be arranged to be driven by a hydraulic ram, the engagement of the teeth of this gear quadrant with the teeth of the other quadrant serving to drive the said other quadrant. Preferably, the ratio between the teeth of the gear quadrants is 1.15 to 1 whereby the shaft on which one of the gear quadrants is mounted is driven at a faster rate than the other shaft so that the valve member mounted on this shaft is moved to the closed position before the other valve member.

The clamping device is preferably pivotally mounted on the drive means and on one of the clamping members and is releasably engageable with the other clamping member. The releasable engagement preferably takes the form of a pin mounted on said other clamping member which is arranged to be engaged by a claw on the clamping device. The clamping device itself is desirably pivotably mounted on a housing carrying the said one gear quadrant which is arranged to be driven directly by the hydraulic ram.

It is preferred that the band coupler should consist of three segments, a first segment carrying at one end said one clamping member, a second segment pivotally connected at one end to the other end of the first segment and a third segment pivotally connected at one end to the other end of the second segment and carrying at its other end the other clamping member.

The valve casings are desirably provided with flanges and the segments are desirably provided with grooves adapted to receive said flanges to clamp the valve casings together.

According to a further embodiment of the invention, two further valves are provided which are adapted to be incorporated in a gas return line. Each said further valve is incorporated in a respective valve casing housing a valve member for the main product line. The band coupler is modified so that, when the valve casings are clamped together, the said further valves for the return line are also clamped together and, when the valve casings are released by the band coupler, the said further valves are released from each other but are still connected to or incorporated in the respective valve casings. With this arrangement, the return line will be retained with the main product line and will not be allowed to fall to the deck of a tanker. The said further valves will be arranged to be operated by the drive means simultaneously with the main valves. In this way emergency release couplers for a main product line and a gas return line can be incorporated into a single unit.

BRIEF DESCRIPTION OF THE DRAWINGS

The invention will now be further discribed, by way of example, with reference to the drawings, in which.

In the drawings, like parts are denoted by like reference numerals.

DESCRIPTION OF PREFERRED EMBODIMENTS

Figure 1:
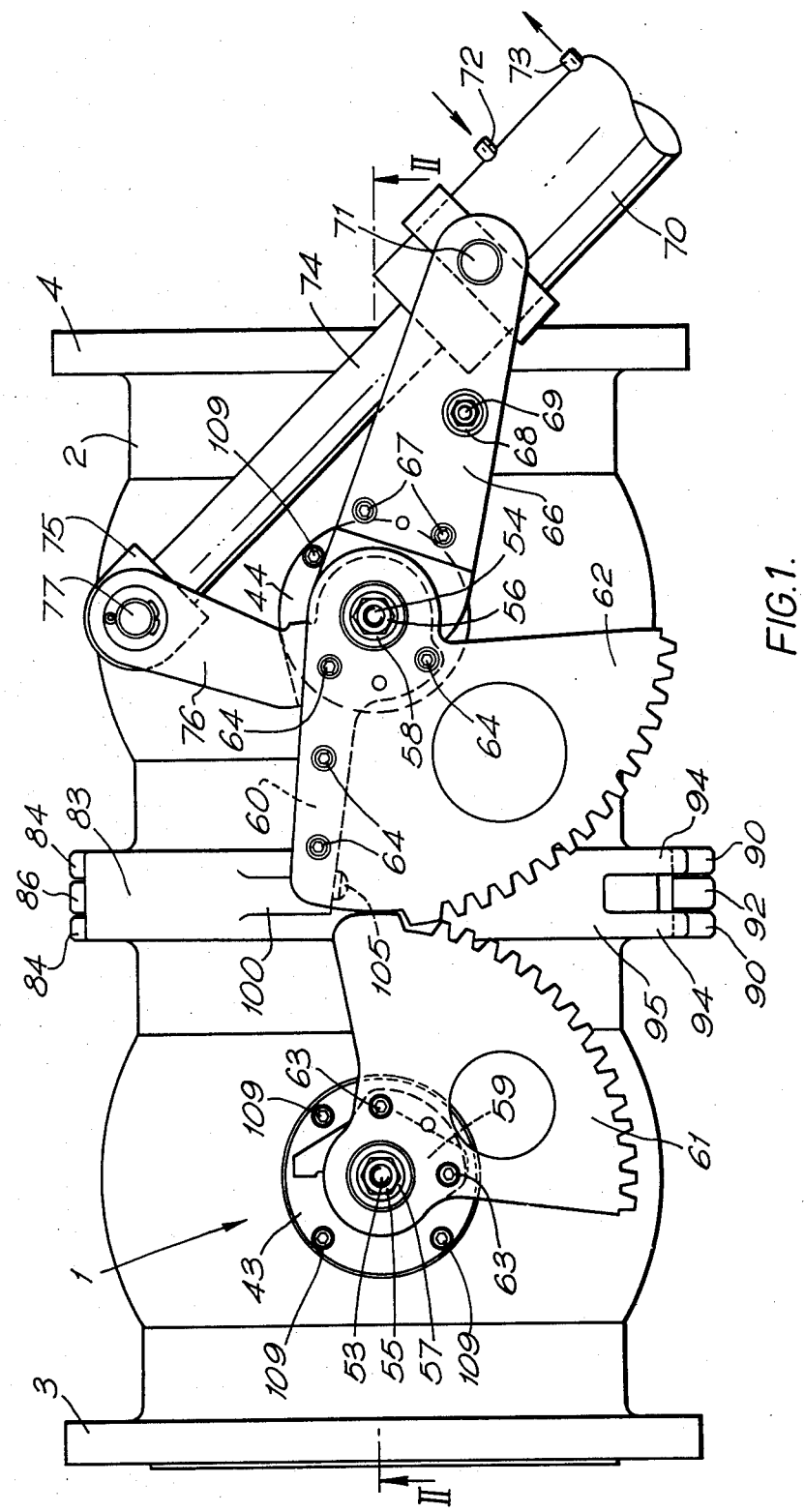
FIG. 1 is a plan view of one embodiment of an emergency release coupler according to the invention.

Reference will first be made to FIGS. 1 to 4 of the drawings in which the emergency release coupler according to the invention comprises a first valve consisting of a valve casing 1 having a flange 3 at one end which is adapted to be connected to a first pipe (not shown) and a chamfered flange 5 at its other end and a second valve likewise consisting of a valve casing 2 having a flange 4 at one end which is adapted to be connected to a second pipe (not shown) and a chamfered flange 6 at its other end.

A sealing ring 7 in the form of a rubber O-ring or the like is positioned in the valve casing 1 adjacent said other end and is held in place by a ring 9 which has an external screw-thread engageable with an internal screw-thread provided in said other end of the valve casing 1. A part-spherical or ball valve member 11 is located in the valve casing 1 being mounted for pivotal movement with respect to the casing on a pair of shafts 13 and 21. The shaft 13 consists of a stub shaft which is located in a bore in the wall of the valve casing 1 and is secured in place by a bolt 15, the threaded shank of which is engageable with an internal screw-thread provided in the bore in the valve casing 1. The bolt 15 is provided with a hexagonal head for engagement by a spanner or like tool so that the shaft may be bolted firmly in place, a washer 17 being interposed between the head of the bolt 15 and the valve casing 1. The shaft 13 is further provided with a groove for the reception of an O-ring 19 which provides an effective seal between the shaft and the bore in the casing. The valve member 11 may be free to pivot on the shaft 13 and/or the shaft 13 may be free to pivot in the bore in the casing 1.

The shaft 21 is axially aligned with the shaft 13 and is keyed to the valve member 11 for rotation therewith. The shaft 21 is further provided, over part of its length, with a sleeve 23 which is secured to the shaft by a cross pin 25 and which is rotatably mounted in a bore in the wall of the valve casing 1. The sleeve is desirably made of bearing material for this purpose and the shaft 21 extends out of the valve casing for a considerable distance for a purpose to be hereinafter described.

Mounted in said one end of the valve casing 1 is a washer 27 having a groove in its radially outer face for the reception of an O-ring 29 of rubber or like material, which provides a seal between the washer 27 and the valve casing 1, and a second groove in its radially inner face, which is chamfered, for the reception of an O-ring 31 again of rubber or like material. The washer 29 is held in place by a ring 33 which is secured to the flange 3 by means of screws 35, an O-ring 37 of rubber or like material being interposed between the ring 33 and the washer 29 to provide an effective seal. A further O-ring 39 of rubber or like material may also be located in a groove in the ring 33 to provide a seal between said ring and the flanged end of the casing 1.

Figure 2:
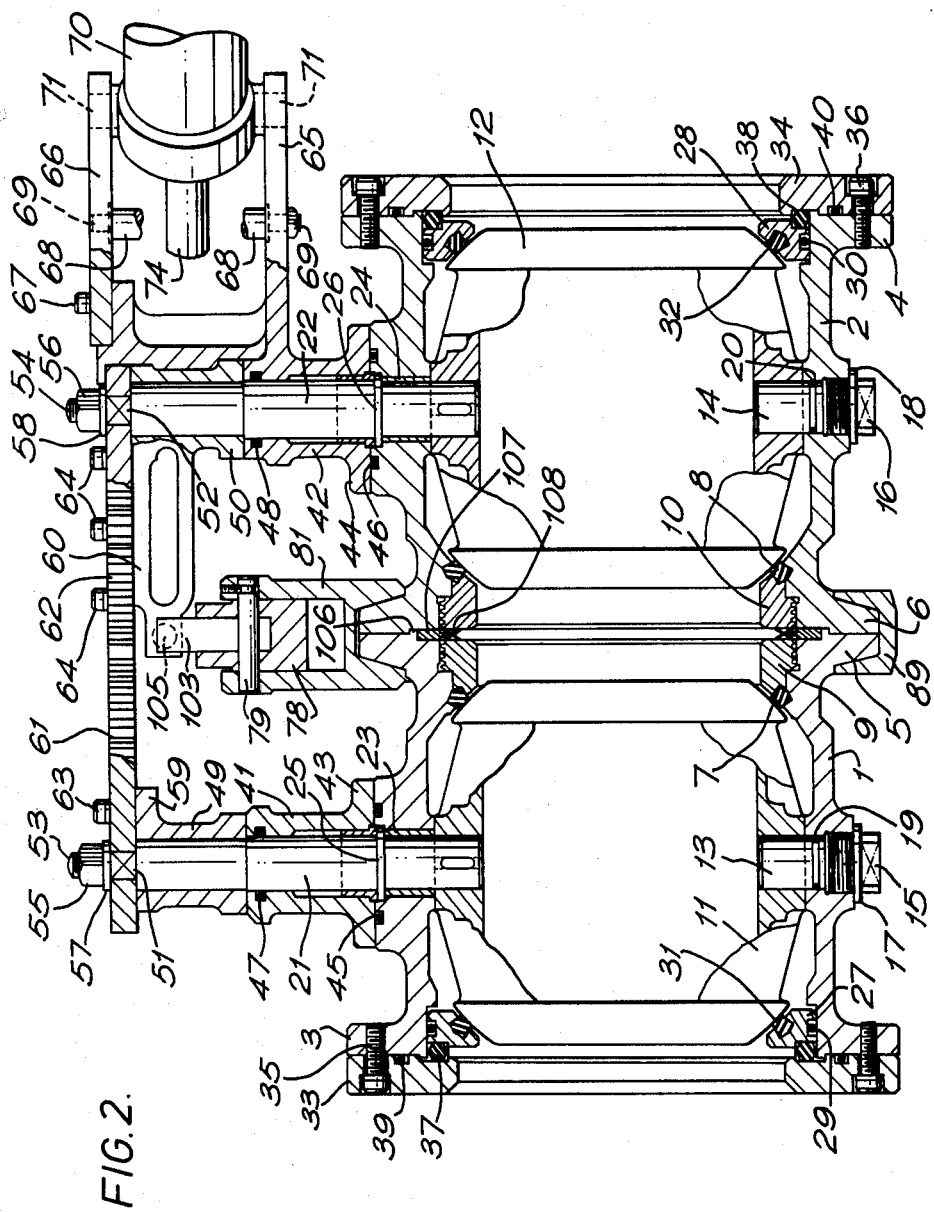
FIG. 2 is a section taken on the line II—II in FIG. 1 but showing some parts not in section to aid an understanding of the invention.

When in the closed position as shown in FIG. 2 of the drawings, the valve member 11 is arranged to seat against the rings 7 and 31 to close the valve.

Similarly, a sealing ring 8 in the form of a rubber O-ring or the like is positioned in the valve casing 2 adjacent said other end and is held in place by a ring 10 which has an external screw-thread engageable with an internal screw-thread provided in the said other end of the valve casing 2. A part-spherical valve member 12 is located in the valve casing 2 being mounted for pivotal movement with respect to the casing on a pair of shafts 14 and 22. The shaft 14, which also takes the form of a stub shaft, is located in a bore in the valve casing 2 and is secured in place by a bolt 16 the threaded shank of which is engageable with an internal screw-thread provided in the bore in the valve casing 2. The bolt 16 is provided with a hexagonal head for engagement by a spanner or like tool so that the shaft 14 may be bolted firmly in place, a washer 18 being interposed between the head of the bolt 16 and the valve casing 2. The shaft 14 is further provided with a groove for the reception of an O-ring 20 which provides an effective seal between the shaft and the bore in the casing. The valve member 12 may be free to pivot on the shaft 14 and/or the shaft 14 may be free to pivot in the bore in the casing 2.

The shaft 22 is axially aligned with the shaft 14 and is keyed to the valve member 12 for rotation therewith. The shaft 22 is further provided, over part of its length, with a sleeve 24 which is secured to the shaft by a cross pin 26 and which is rotatably mounted in a bore in the wall of the valve casing 2. The sleeve is desirably made of bearing material for this purpose and the shaft 22 extends out of the valve casing for a considerable distance for a purpose to be hereinafter described.

Mounted in said one end of the valve casing 2 is a washer 28 which is similar to the washer 27 and is provided with O-rings 30 and 32 of rubber or like material, the O-ring 30 providing a seal between the washer 28 and the valve casing 2. The washer 28 is held in place by a ring 34 which is secured to the flange 4 by screws 36, O-rings 38 and 40 of rubber or like material being provided respectively between the ring 34 and washer 28 and between the ring 34 and the flanged end of the valve casing 2 to provide seals.

As with the valve member 11, when the valve member 12 is in the closed position, as shown in FIG. 2 of the drawings, it is arranged to seat against the rings 8 and 32 to close the valve.

Mounted on the outwardly projecting portion of the shaft 22 is a tubular sheath or sleeve 42 from which a plate 65 extends in a radial direction. The sleeve is provided at one end with a flange 44 which is designed to bear against and to be secured to the wall of the valve casing 2, an O-ring 46 of rubber or like material being located in a groove in the valve casing surrounding the shaft 22 to provide a seal between the casing and the sleeve. A further O-ring 48 of rubber or like material is provided in a groove in the shaft 22 to provide a seal between the sleeve and the shaft. Part of the bore in the sleeve 42 is of increased diameter to accommodate the bearing sleeve 24. A further sleeve 50 is also mounted on the outwardly projecting portion of the shaft 22, said further sleeve being rotatable with respect to the fixed sleeve 42. The portion 52 of the shaft 22 projecting beyond the outer end of the sleeve 50 is of reduced size and is substantially square in cross-section and the shaft terminates in a reduced-diameter screw-threaded end portion 54.

Secured to the sleeve 42 by screws 67 and extending substantially parallel to the plate 65 is a further plate 66, the two plates being connected by pins 71 to one end of the cylinder 70 of a hydraulic ram. The plates 65 and 66 are braced apart by a rod 68 which is held in position by screws 69 passing through bores in the plates 65 and 66 and engaging in screw-threaded bores in the ends of the rod 68. The cylinder 70 is provided with an inlet port 72 and an exhaust port 73 for connection to suitable fluid lines (likewise not shown). A rod 74 of the piston of the hydraulic ram extends from the end of the cylinder on which the plates 65 and 66 are mounted. An end cap 75 is mounted on the outwardly projecting end of the piston rod 74 and one end of an arm 76 is pivotally connected to the end cap by a pivot pin 77. The other end of the arm is secured to or formed integrally with the said further sleeve 50.

A gear quadrant 62 is mounted on the substantially square section 52 of the shaft 22, said quadrant being provided with a substantially square aperture for receiving the section 52 so that the quadrant will rotate with the shaft, and the quadrant is secured on the shaft by means of a nut 56 engaging the screw-threaded end 54 of the shaft with a washer 58 being interposed between the nut 56 and the quadrant 62. A lever arm 60 extends radially from the sleeve 50 and the gear quadrant 62 is secured to this lever arm by screws 64.

The teeth of the gear quadrant 62 are arranged to mesh with the teeth of a gear quadrant 61 which is mounted on a portion 51 of the shaft 21. This portion 51 of the shaft 21 is similar to the portion 52 of the shaft 22 in that it is of reduced size and is substantially square in cross-section. Similarly, the quadrant 61 is provided with a substantially square aperture for receiving the section 51 so that the quadrant 61 will rotate with the shaft 21 and the end of the shaft 21 terminates in a reduced-diameter screw-threaded portion 53.

A tubular sheath or sleeve 41 is mounted on the outwardly projecting portion of the shaft 21 and this is followed by a further sleeve 49 which terminates at the location on the shaft at which the substantially square section 51 is provided. The sleeves 41 and 49 and the quadrant 61 are held on the shaft by a nut 55 which engages the screw-threaded end of the shaft 21, a washer 57 being interposed between the nut and the quadrant 61.

The sleeve 49 is provided with a small radial protrusion 59 to which the quadrant 61 is secured by means of screws 63. The sleeve 41 is provided at one end with a flange 43 which is designed to bear against and to be secured to the wall of the valve casing 1, an O-ring 45 of rubber or like material being located in a grove in the valve casing surrounding the shaft 21 to provide a seal between the casing and the sleeve. Similarly, a further O-ring 47 of rubber or like material is provided in a groove in the shaft 21 to provide a seal between the sleeve and the shaft. Again, part of the bore in sleeve 41 is of increased diameter to accommodate the bearing sleeve 23. The shaft 21, sleeve 49 and quadrant 61 are rotatable with respect to the fixed sleeve 41.

Figure 3:
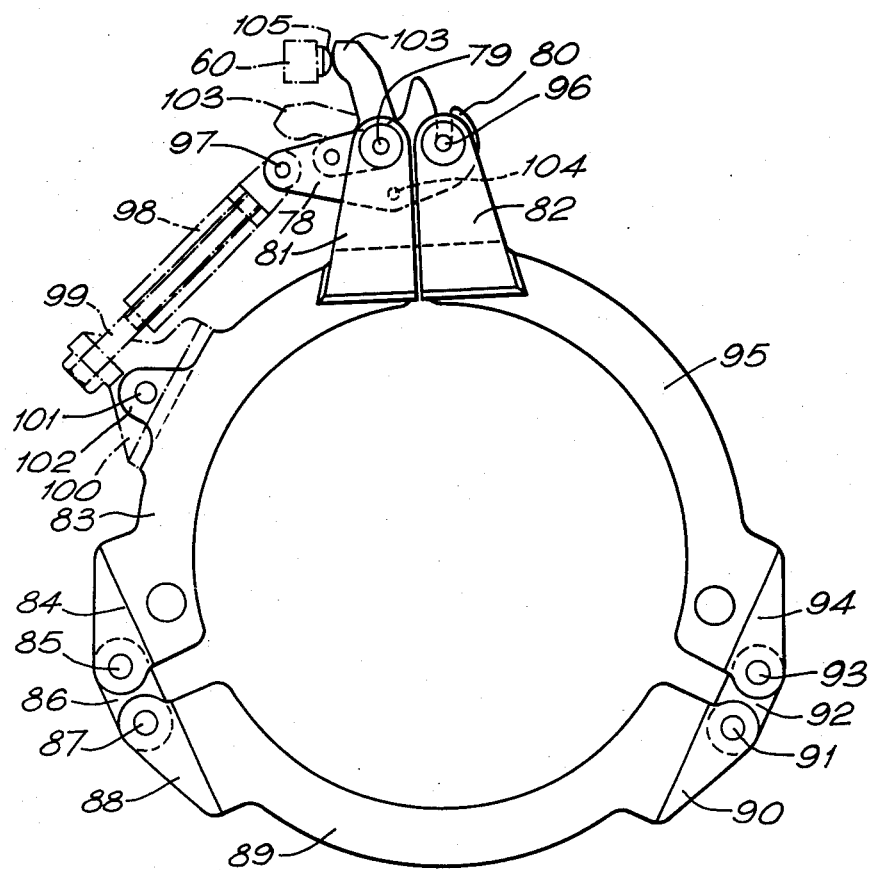
FIG. 3 is an end view of a band coupler forming part of the emergency release coupler shown in FIG. 1 and showing the clamping device in a clamping position.

Turning now to FIG. 3 of the drawings, a clamping device in the form of a lever 78 is pivotally mounted, by means of a pivot pin 79, on a first clamping member 81. This member 81 is rigidly secured to or formed integrally with one end of an arced segment 83. The other end of the segment 83 is provided with jaws 84 which are pivotally connected by a pivot pin 85 to a bracket 86 which in turn is pivotally connected by a pivot pin 87 to jaws 88 formed on one end of a second arced segment 89. The other end of the segment 89 is similarly provided with jaws 90 which are pivotally connected by a pivot pin 91 to a bracket 92 which in turn is pivotally connected by a pivot pin 93 to jaws 94 formed on one end of a third arced segment 95. A second clamping member 82 is rigidly secured to or formed integrally with the other end of the segment 95. Each of the segments 83, 89 and 95 is provided with a radially inner groove having chamfered side walls which are adapted to receive the chamfered flanges 5 and 6 of the valve casings 1 and 2 when the valves are coupled together as shown by the segment 89 in FIG. 2 of the drawings.

The second clamping member 82 is provided with a pin 96 which is adapted to receive a clawed end 80 formed on the lever 78 whereby the two clamping members can be clamped together. The other end of the lever 78 can be pivotally connected by a pivot pin 97 to the cylinder 98 of a screw jack, the screw 99 of which is secured to a bracket 100 which is pivotally mounted by a pivot pin 101 on lugs 102 formed on the segment 83.

The clamping mechanism is completed by a latch release lever 103 which is pivotally mounted on the pivot pin 79 and secured to the lever 78 for pivotal movement therewith by a shear pin 104. The lever 103 is normally arranged to be acted on by a projection 105 provided on the radially outer end of the lever arm 60.

Having described the construction of the emergency release coupler according to the invention, its manner of operation will now be described in detail. The valve members 11 and 12 in each of the valves are normally set to the closed position as shown in FIG. 2 of the drawings before the valve casings 1 and 2 are coupled together. At this stage, the pin 96 on the clamping member 82 is not engaged by the clawed end 80 of the lever 78 and the three segments 83, 89 and 95 are free to pivot loosely. The valve casing 2 will normally be held by the mountings for the cylinder 70 of the hydraulic ram to a shore-based installation and will be connected at the flange end 4 to a pipeline (not shown). The valve casing 1, the flange end 3 of which is connected to a pipeline (not shown) leading to a tanker hold, is then offered up to the valve casing 2 so that the chamfered flanges 5 and 6 mate with one another.

To facilitate correct engagement of the flanged ends of the valve casings 1 and 2, the flanged end 5 of the casing 1 is desirably provided with a shoulder 106 which is engageable in a co-operating recess provided in the flanged end 6 of the casing 2. A sealing ring 107 provided with an annular seal 108 is interposed between the mating ends of the valve casings 1 and 2 to provide an effective seal between the casings. The ring 107 and seal 108 may be permanently secured to the flanged end 5 of the valve casing 1 in a recess provided for this purpose in the shoulder 106.

The segments 83, 89 and 95 are then fitted around the chamfered flanges 5 and 6 and the clawed end 80 of the lever 78 is engaged on the pin 96 on the clamping member 82. At this stage the shear pin 104 is not fitted. The screw jack is now actuated to retract the screw 99 into the cylinder 98 so that the lever 78 is caused to pivot about the pivot pin 79 whereby the clawed end 80 of the lever is forced onto the pin 96. The said clawed end has a cam surface which engages with the pin 96 and is so arranged that, with increasing pivotal movement of the lever 78, the clamping members 81 and 82 are drawn towards each other so that the clamping effect of the segments 83, 89 and 95 on the chamfered flanges 5 and 6 of the valve casings 1 and 2 is increased. The shear pin 104 is then fitted and the screw jack can be removed. At this stage, the gear quadrants 61 and 62 are located in the position shown in the drawings in which the teeth of the quadrants have not commenced to engage with one another and the valve members 11 and 21 are still in the closed position. The coupler is however now ready for use.

The valves can be opened by actuating the main hydraulic ram so that the piston rod 74 is retracted into the cylinder 70. This has the effect of causing the sleeve 50 to rotate, by virtue of the connecting arm 76, which in turn effects rotation of the gear quadrant 62 and shaft 22. Rotation of the shaft 22 causes the associated valve member 12 to move from its closed position to an open position and rotation of the gear qudrant 62 causes its teeth to mesh with the teeth of the gear quadrant 61 and thus to rotate the latter. Rotation of the gear quadrant 61 causes the shaft 21 to rotate to move the associated valve member 11 from the closed to an open position. Fluid can now be passed along the pipelines in either direction, for loading or discharging, through the coupler.

The main hydraulic ram is desirably provided with two stage operation whereby in a first stage it is effective merely to close the valves and in a second stage it is effective to release the coupler. For the first stage operation, the cylinder 70 is actuated to advance the piston rod 74 from the cylinder which causes the gear quadrant 62 to be rotated in the opposite direction, i.e. anti-clockwise as viewed in FIG. 1. This causes the shaft 22 to rotate and to move the associated valve member 12 to the closed position. At the same time, the quadrant 61 is driven by the quandrant 62 and is effective to cause the shaft 21 to rotate to move the associated valve member 11 to the closed position. This condition is illustrated in FIGS. 1 and 2 of the drawings.

The teeth on the two gear quadrants 61 and 62 are desirably arranged to have a ratio of 1.15 to 1 whereby the valve 11 is closed fully before the valve 12 is moved to the fully closed position. This ensures that the valve 11 is closed before the gear teeth move out of meshing engagement with each other and serves to prevent spillage of fluid in the pipeline when the coupler is subsequently released.

Figure 4:
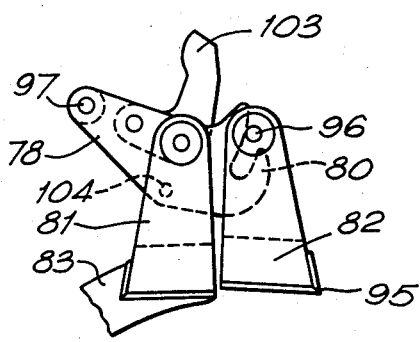
FIG. 4 shows a detail of the coupler shown in FIG. 3 but depicting the clamping device in a released position.

To effect release of the coupler, for example in the event of an emergency or for any other reason, the second stage operation of the main hydraulic ram is brought into action and the cylinder 70 is actuated to advance the piston rod 74 still further from the cylinder. This has the effect of moving the gear quadrant 62 out of meshing engagement with the gear quadrant 61 and, at the same time, to cause the projection 105 on the lever arm 60 to engage the latch release lever 103 as shown in FIG. 3 of the drawings. Further movement of the piston rod 74 causes further rotation of the lever arm 60 which causes the latch release lever 103 to pivot about the pin 79 in a clockwise direction as viewed in FIG. 3. As previously stated, the lever 103 is secured to the lever 78 by the shear pin 104 and, thus, the lever 78 is entrained for pivotal movement with the lever 103. The cam surface on the clawed end 80 of the lever 78 now bears on the pin 96 and as soon as the claw is free of said pin, the pin is forced away by the cam surface as indicated in FIG. 4 of the drawings. The clamping members 81 and 82 are thus forced apart and the segments 95 and 89 are free to fall away from the chamfered flanges 5 and 6. The valve casings 1 and 2 are thereby free to separate and rupture of the pipelines with subsequent spillage of the product which would cause fire hazards and pollution problems can be avoided since the valve members 11 and 12 are moved to the closed position before the coupler is released.

The shear pin 104 is removable so that the latch release lever 103 can be moved to the position shown in chain-dotted lines in FIG. 3 of the drawings in which it can no longer be acted on by the projection 105 on the lever arm 60. This of course renders the release mechanism inoperative but this condition may be necessary in order to carry out hydraulic tests.

The sleeves 41 and 42 are desirably secured to the respective valve casings 1 and 2 by means of bolts 109 (FIG. 1) but this is not essential and other means of securement may be utilised if desired. Further, the invention is not restricted to the above-described embodiment but variations and modifications may be made without departing from the scope of the invention.

For example, the main ram consisting of the cylinder 70 and piston rod 74 may, if desired, be pneumatically operated instead of hydraulically operated as above described. Further, the screw jack consisting of the cylinder 98 and screw 99 may, if desired, be replaced by a ram which may be hydraulically operated or pneumatically operated.

The valve casings 1 and 2 may include further valve members and connections for a return line. Such an arrangement is shown in FIGS. 5 to 8 of the drawings in which the same reference numerals have been used for the components which correspond to the same components of the embodiment shown in FIGS. 1 to 4 of the drawings.

Figure 5:
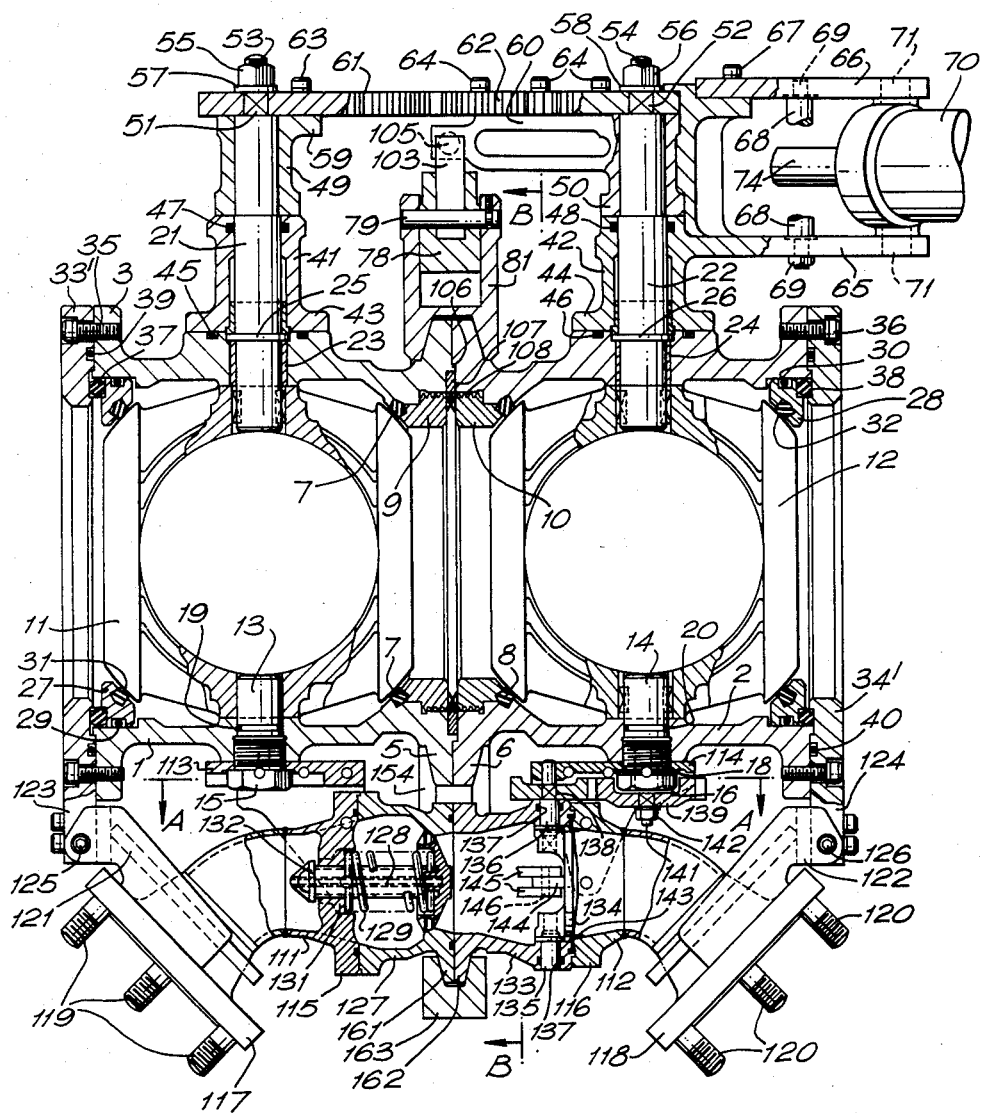
FIG. 5 is a vertical section, corresponding to FIG. 2, but showing a modified embodiment of an emergency release coupler according to the invention having coupling means for a gas return line.

Referring now to FIG. 5 of the drawings, it will be seen that a casing 111 is provided adjacent one end with a plate-like extension member 113 which is provided with a bore adapted to receive the bolt 15 by means of which the casing 111 can be bolted to the valve casing 1. The washer 17 is omitted since the plate-like member 113 serves as a washer. The other end of the casing 111 is provided with a flange 117 from which a number of screw-threaded studs 119 project to enable a return line (not shown) to be secured to the casing 111. A pair of wings 121 extend from this end of the casing and these are secured to an extension 123 formed on the ring 33' by means of a transverse bolt 125.

A similar casing 112 is provided adjacent one end with a plate-like extension member 114 which is provided with a bore adapted to receive the bolt 16 by means of which the casing 112 can be bolted to the valve casing 2. The other end of the casing 112 is provided with a flange 118 from which a number of screw-threaded studs 120 project to enable another part of the return line (not shown) to be secured to the casing 112. A similar pair of wings 122 extend from this end of the casing and these are secured to an extension 124 formed on the ring 34' by means of a transverse bolt 126.

The said one end of the casing 111 is provided with a flange 115 to which is secured a valve housing 127. A valve member 128 is located in the housing 127 and is urged by a coil spring 129 against a valve seat provided on the housing 127 as shown more clearly in FIG. 7 of the drawings. The coil spring 129 bears at one end on the head of the valve member 128 and at the other end on a bushing 131 which is located in a stepped bore provided in a radially extending wall of the flange 115. The stem of the valve member 128 extends through this bore and a cap 132 is fitted on the projecting end of the valve stem.

The said one end of the casing 112 is provided with a flange 116 to which is secured a valve housing 133. A disc valve member 134 is mounted on a pair of axially-aligned shafts 135 and 136 which are rotatably mounted in respective bores in the housing 133, O-rings 137 of rubber or like material being located in grooves in said bores to provide seals between the bores and the shafts. The lower shaft 135 terminates flush with the outer surface of the housing 133 but the upper shaft 136 projects beyond said surface and has a squared section 138 on which a quadrant-like member 139 is mounted. The outer end of the shaft 136 is of circular cross-section and extends through a bore in the plate-like member 114. The quadrant-like member 139 is provided with a further bore of square cross-section which is adapted to receive a squared section of a rod 141 which is provided with a screw-threaded end so that it can be secured to the quadrant-like member 139 by means of a nut 142. The other end of the rod 141 is secured to the gear quadrant 62 so that movement of the said quadrant 62 will impart corresponding movement to the quadrant-like member 139.

Referring now again to FIG. 7 of the drawings, it will be seen that, in the closed position of the valve, the disc valve member 134 bears against a valve seating 143 of resilient material which is clamped between the flange 116 and the valve housing 133. The disc valve member 134 is provided, on its face remote from the valve seating 143, with a lug 144 to which a pair of lever arms 145 are pivotally connected at one end by a pivot pin 146. The other ends of the lever arms 145 are interconnected by a further pin 147 on which a roller 148 is rotatably mounted between the lever arms. One end of a further lever arm 149 is pivotally connected by a pin 150 to the lever arms 145 intermediate the ends thereof and the other end of the lever arm 149 is pivotally mounted on a pin 151 which is secured to the valve housing 133. The arrangement is such that the roller 148 bears against the head of the valve member 128 but, in the closed position of the disc valve member 134, the force of the spring 149 is sufficient to maintain the valve member 128 in the closed position.

Figure 6:
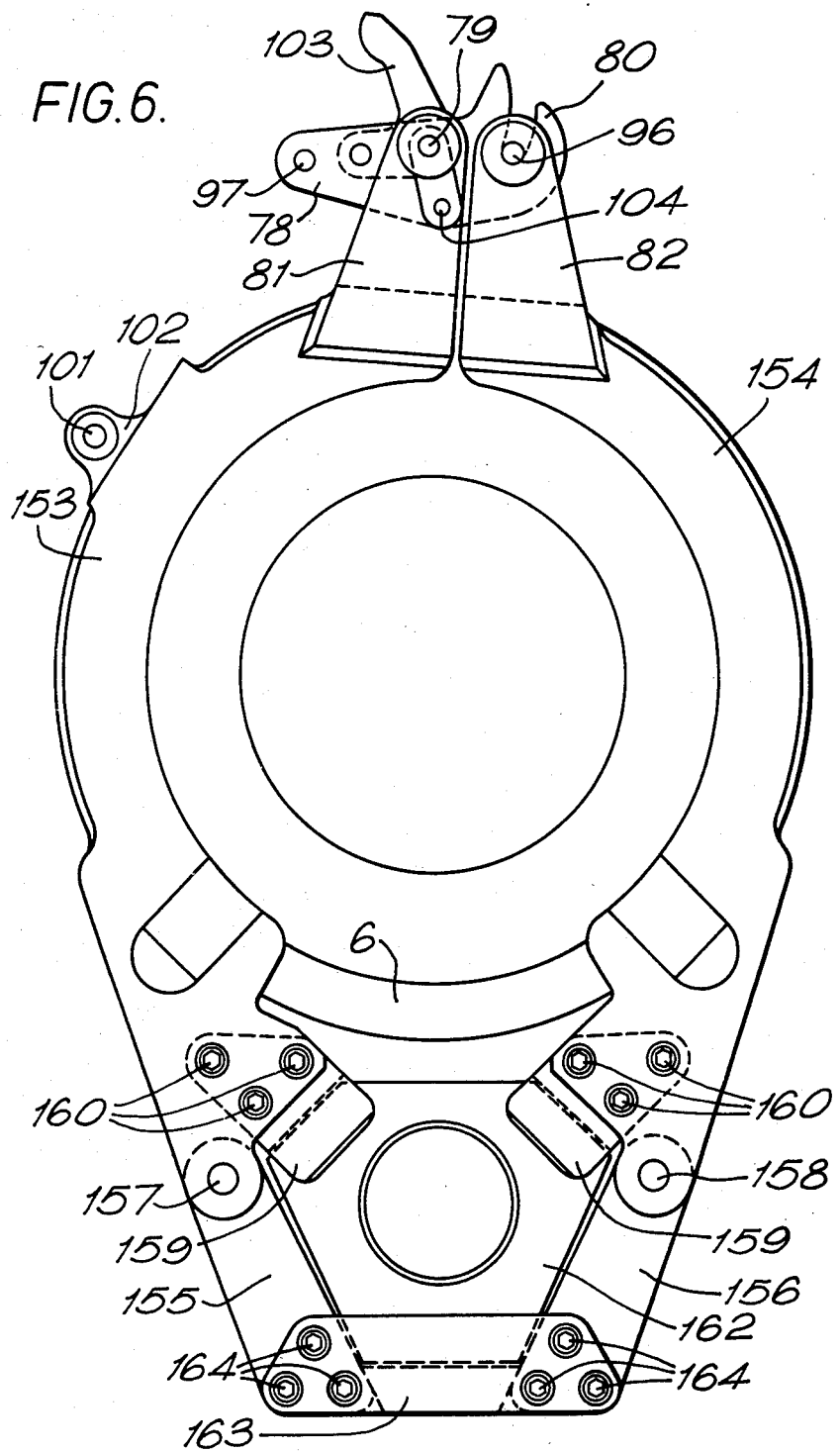
FIG. 6 is an end view of a band coupler forming part of the emergency release coupler shown in FIG. 5 and viewed in the direction of the arrows B—B in FIG. 5.

In this embodiment, the arced segments 83 and 95 are replaced by arced segments 153 and 154 to each of which is pivotally connected a respective link 155, 156 by a respective pivot pin 157, 158 as shown in FIG. 6. Clamping members 81 and 82 are rigidly secured to or formed integrally with the segments 153 and 154 respectively and the clamping device is otherwise the same as in the embodiment described with reference to FIGS. 1 to 4 of the drawings. Further clamping members 159 are secured by screws 160 to the arced segments and are arranged to engage flanges 161 and 162 formed respectively on the valve housings 127 and 133 to clamp said housings together. Yet another clamping member 163 is secured to the links 155 and 156 by screws 164 and this clamping member also serves to clamp together the flanges 161 and 162 on the valve housings 127 and 133.

This embodiment is otherwise similar to the embodiment shown in FIGS. 1 to 4 of the drawings to which reference should be made for a full description of the other components shown in FIGS. 5 and 6 of the drawings.

The emergency release coupler shown in FIGS. 5 to 8 of the drawings is fitted in a similar manner to the coupler shown in FIGS. 1 to 4 of the drawings. The valve members 11 and 12 are set to the closed position as shown in FIG. 5 of the drawings before the valve casings 1 and 2 are fitted together. Similarly, the valve members 128 and 134 in the return line are also in the closed position when the valve housings 127 and 133 are fitted together with the flanges 161 and 162 in abutting relationship. The clamping member 163 is fitted over the flanges 161 and 162 to hold them together and the arced segments 153 and 154 are then pivoted inwardly about the respective pivot pins 157 and 158 so that the clamping members 159 engage the flanges 161 and 162 and, at the same time, the segments 153 and 154 engage the flanges 5 and 6 of the valve casings 1 and 2. The clawed end 80 of the lever 78 is engaged on the pin 96 on the clamping member 82 and the clamping mechanism is actuated by a screw jack or like means (not shown) as in the previous embodiment.

The valves can be opened in a similar manner to the previous embodiment but, in this case, rotation of the gear quadrant 62 will cause the quadrant-like member 139 to move, by virtue of its connection to the quadrant 62 by the link rod 141, and this will cause the shaft 136 to rotate about its axis. Rotation of the shaft 136 will cause the disc-like member 134 to rotate from the closed position shown in FIG. 7 to the open position shown in FIG. 8 of the drawings. As the valve member 134 moves to the open position, the lever arms 145 are moved to cause the roller 148 to force the valve member 128 off its seating against the force of the coil spring 129. The lever arms 145 and 149 and the valve member 128 assume the positions shown in FIG. 8 of the drawings when the disc-like member 134 is moved to the open position.

Figure 7:
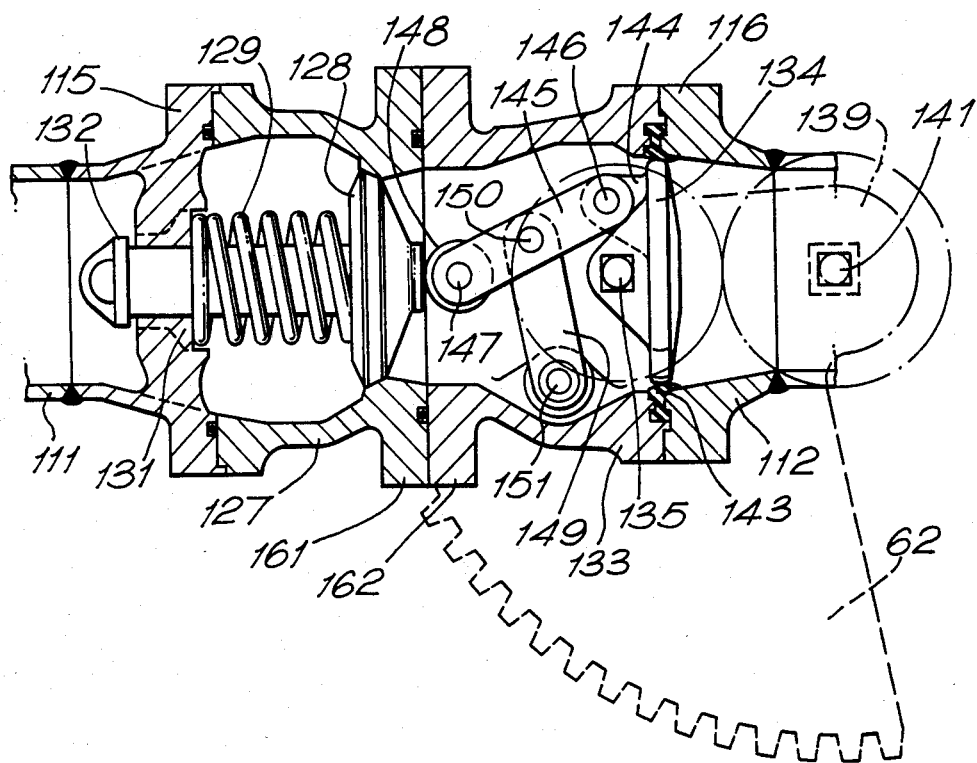
FIG. 7 is a section taken on the line A—A in FIG. 5 in the direction of the arrows and showing the valves in the closed position.
Figure 8:
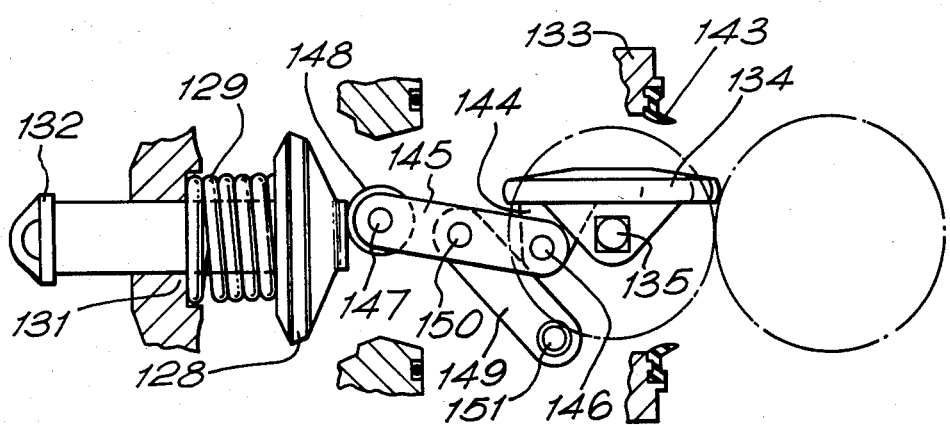
FIG. 8 is a diagrammatic section, corresponding to FIG. 7, showing the same valves in the open position.

This embodiment of the emergency release coupler is desirably also provided with two stage operation whereby, in the first stage, the valves are closed but the coupler remains intact while, in the second stage, the coupler is released. For the first stage operation, the cylinder 70 is actuated as in the previous embodiment to advance the piston rod 74 from the cylinder so that the gear quadrant 62 is rotated which causes the shaft 22 to rotate to move the valve member 12 to the closed position. Rotation of the gear quadrant 62 not only causes the gear quadrant 61 to rotate the shaft 21 to move the valve member 11 to the closed position but also causes the quadrant-like member 139 to rotate the shaft 136 to move the disc-like valve member 134 to the closed position. As the valve member 134 is moved to the closed position, the lever arms 145 and 149 are moved from the position shown in FIG. 8 to the position shown in FIG. 7 of the drawings and the coil spring 129 is again effective to move the valve member 128 to the closed position as shown in FIGS. 5 and 7 of the drawings.

As in the previous embodiment shown in FIGS. 1 to 4 of the drawings, the teeth on the gear quadrants 61 to 62 are desirably so arranged that the valve 11 is fully closed before the valve 12 is moved to the fully closed position. In this case, however, the linkage formed by the lever arms 146 and 149 is so arranged that the spring 129 is effective to move the valve member 128 to the closed position before the valve member 134 is moved to the closed position.

To effect release of the coupler shown in FIGS. 5 to 8 of the drawings, the second stage operation of the main hydraulic ram is brought into action and the cylinder 70 is actuated to advance the piston rod 74 still further from the cylinder. This has the effect of disengaging the gear quadrants 61 and 62 and of causing the latch release lever 103 to be engaged by the projection 105 on the lever arm 60 (not shown in FIG. 6) and to be pivoted about the pin 79 in a clockwise direction as viewed in FIG. 6. By virtue of the shear pin 104, the lever 78 is entrained for pivotal movement with the lever 103 and the clawed end 80 of the lever 78 is moved free of the pin 96 and said pin is forced away by the cam surface on the lever 78. The clamping members 81 and 82 are thus forced apart as in the previous embodiment and the segment 154 is free to fall away from the chamfered flanges 5 and 6. The segment 154 will initially pivot about the pin 158 thereby releasing the associated clamping member 159 from the flanges 161 and 162 and the links 155 and 156 and interconnecting clamping member 163 will then pivot about the pin 157 so that the clamping member 163 will also fall free of the flanges 161 and 162. The flanges 161 and 162 can then fall free of the remaining clamping member 159 whereby the coupling of the return line is released and, at the same time, the flanges 5 and 6 can fall clear of the arced segment 153 to free the coupling between the valve casings 1 and 2. In this manner, both the valve casings 1 and 2 and the valve casings 127 and 133 are free to separate and thus rupture of the pipe line and return line can be avoided. This thereby prevents spillage of the product with concomitant fire hazards and pollution problems since all of the valve members 11, 12 and 128, 134 are moved to the closed position before the coupler is released.

It will be seen that, by means of the embodiment shown in FIGS. 5 to 8 of the drawings, the separation of both the main product line and the return line can be achieved by a single ram and the pipe connection of the gas return line will be retained with the product line and will not be allowed to fall to the deck of a tanker which is loading or unloading.

It will be seen that the emergency release couplers according to the invention provide safe and reliable operation which ensures that pipelines can be uncoupled in the event of an emergency without loss of a fluid product carried in the pipeline. While the couplers according to the invention are primarily intended for the petroleum industry for use in loading and discharging tankers from both onshore and offshore installations, it should be noted that the couplers are not restricted to such use and may be used for coupling together pipes for many other applications and uses.

I claim:

1. An emergency release coupler for releasably coupling together two pipes which comprises a first valve adapted to be coupled to a first pipe, a second valve adapted to be coupled to a second pipe and a band coupler for coupling together said valves; wherein each valve comprises a casing housing, a pivotally mounted valve member which is movable between a closed position and an open position, each valve member being mounted on a respective shaft which extends out of the associated casing; wherein the band coupler comprises a plurality of segments, each segment being pivotally connected at one end to an adjacent segment and connected at its other end to one of a further segment and a clamping member, two said clamping members being provided which are adapted to be releasably held together by a clamping device and the segments and clamping members serving to clamp the valve casings together; and wherein drive means are provided for turning said shafts to operate said valves and for operating said clamping device, the drive means including gear means mounted on said shafts, said gear means providing a gear drive between the shafts when the valve casings are clamped together, the drive means being arranged, when driven in one direction, to cause the shafts to pivot to move the associated valve members to the open position and, when driven in a direction opposite to said one direction, to cause the shafts to pivot to move the associated valve members to the closed position and then to operate the clamping device to release at least one of said clamping members so that the clamping members and segments are no longer effective to clamp the valve casings together whereby said casings can be separated from each other.

2. An emergency release coupler as claimed in claim 1, wherein the gear means are arranged to cause one shaft to move its associated valve member to the closed position before the other shaft is effective to move its associated valve member to the closed position.

3. An emergency release coupler as claimed in claim 1, wherein the band coupler consists of three segments, a first segment carrying at one end said one clamping member, a second segment pivotally connected at one end to the other end of the first segment and a third segment pivotally connected at one end to the other end of the second segment and carrying at its other end the other clamping member.

4. An emergency release coupler as claimed in claim 1, wherein two further valves are provided which are adapted to be incorporated in a gas return line, each said further valve being incorporated in a respective one of the valve casings housing a valve member of said first and said second valves.

5. An emergency release coupler as claimed in claim 4, wherein the band coupler is so arranged that, when the valve casings are clamped together, the said further valves are also clamped together by the band coupler and, when the valve casings are released by the band coupler, the said further valves are released from each other but are still incorporated in the respective valve casings.

6. An emergency release coupler for releasably coupling together two pipes which comprises a first valve adapted to be coupled to a first pipe, a second valve adapted to be coupled to a second pipe and a band coupler for coupling together said valves; wherein each valve comprises a casing housing a pivotally mounted valve member which is movable between a closed position and an open position, each valve member being mounted on a respective shaft which extends out of the associated casing; wherein the band coupler comprises a plurality of segments, each segment being pivotally connected at one end to an adjacent segment and connected at its other end to one of a further segment and a clamping member, two said clamping members being provided which are adapted to be held together by a clamping device and the segments and clamping members serving to clamp the valve casings together; and wherein drive means are mounted on said shafts and are coupled to said clamping device, the drive means being arranged, when driven in one direction, to cause the shafts to pivot to move the associated valve members to the open position and, when driven in a direction opposite to said one direction, to cause the shafts to pivot to move the associated valve members to the closed position and then to operate the clamping device to release at least one of said clamping members so that the clamping members and segments are no longer effective to clamp the valve casings together whereby said casings can be separated from each other; said drive means comprising mechanical drive means in the form of gear drives, said gear drives comprising a pair of gear quadrants, each mounted on a respective valve shaft and arranged to mesh with one another when the valve casings are clamped together.

7. An emergency release coupler as claimed in claim 6, wherein one of the gear quadrants is arranged to be driven by a hydraulic ram, the engagement of the teeth of this gear quadrant with the teeth of the other gear quadrant serving to drive the said other quadrant.

8. An emergency release coupler as claimed in claim 7, wherein the ratio between the teeth of the gear quadrants is 1.15 to 1 whereby the shaft on which one of the gear quadrants is mounted is driven at a faster rate than the other shaft so that the valve member mounted on this shaft is moved to the closed position before the other valve member.

9. An emergency release coupler as claimed in claim 7, wherein the clamping device is pivotally mounted on one of the clamping members and is releasably engageable with the other clamping member, the releasable engagement between the clamping device and the said other clamping member comprising a pin mounted on said other clamping member and a claw on the clamping device, said claw being engageable with said pin.

10. An emergency release coupler for releasably coupling together two pipes which comprises a first valve adapted to be coupled to a first pipe, a second valve adapted to be coupled to a second pipe and a band coupler for coupling together said valves; wherein each valve comprises a casing housing a pivotally mounted valve member which is movable between a closed position and an open position, each valve member being mounted on a respective shaft which extends out of the associated casing; wherein the band coupler comprises a plurality of segments, each segment being pivotally connected at one end to an adjacent segment and connected at its other end to one of a further segment and a clamping member, two said clamping members being provided which are adapted to be held together by a clamping device and the segments and clamping members serving to clamp the valve casings together; and wherein drive means are mounted on said shafts and are coupled to said clamping device, the drive means being arranged, when driven in one direction, to cause the shafts to pivot to move the associated valve members to the open position and, when driven in a direction opposite to said one direction, to cause the shafts to pivot to move the associated valve members to the closed position and then to operate the clamping device to release at least one of said clamping members so that the clamping members and segments are no longer effective to clamp the valve casings together whereby said casings can be separated from each other; wherein two further valves are provided which are adapted to be incorporated in a gas return line, each said further valve being incorporated in a respective one of the valve casings housing a valve member of said first and said second valves, one of said further valves has a valve member which is arranged to be moved in synchronism with the valve member of one of said first and second valves when the drive means is actuated.

11. An emergency release coupler as claimed in claim 10, wherein the other of said further valves has a valve member which is arranged to be moved to an open position, against the force of a spring, by a linkage connected to the valve member of said one further valve.

* * * * *